United States Patent

Baierweck et al.

[11] Patent Number: 5,482,983
[45] Date of Patent: Jan. 9, 1996

[54] FLAMEPROOFED THERMOPLASTIC MOLDING MATERIALS

[75] Inventors: Petra Baierweck, Schifferstadt; Brigitte Gareiss, Ludwigshafen; Christoph Plachetta, Limburgerhof; Hans-Peter Beringer, Carlsberg, all of Germany

[73] Assignee: BASF Aktiengesellschaft, Ludwigshafen, Germany

[21] Appl. No.: 381,273

[22] Filed: Jan. 31, 1995

Related U.S. Application Data

[63] Continuation of Ser. No. 814,634, Dec. 30, 1991, abandoned.

[30] Foreign Application Priority Data

Jan. 12, 1991 [DE] Germany .......... 41 00 740.9

[51] Int. Cl.$^6$ .......... C08K 3/32
[52] U.S. Cl. .......... 524/80; 524/414; 524/494; 524/495; 524/538; 524/706
[58] Field of Search .......... 524/414, 538, 524/706, 80

[56] References Cited

U.S. PATENT DOCUMENTS

| | | | |
|---|---|---|---|
| 4,563,495 | 1/1986 | Kawaguchi et al. | 524/413 |
| 4,670,508 | 6/1987 | Ohdaira et al. | 524/496 |
| 4,785,031 | 11/1988 | Scarso | 524/414 |
| 4,877,823 | 10/1989 | Plachetta et al. | 524/414 |
| 5,104,924 | 4/1992 | Goetz et al. | 524/414 |
| 5,314,912 | 5/1994 | Yoshitani et al. | 524/458 |

FOREIGN PATENT DOCUMENTS

| | | |
|---|---|---|
| 0693287 | 8/1964 | Canada . |
| 0092776 | 11/1983 | European Pat. Off. . |
| 0205662 | 12/1985 | European Pat. Off. . |
| 0255901 | 2/1988 | European Pat. Off. . |
| 0287955 | 10/1988 | European Pat. Off. . |
| 0303031 | 2/1989 | European Pat. Off. . |
| 1569057 | 10/1970 | Germany . |
| 0114453 | 9/1975 | Japan . |
| 2062857 | 3/1987 | Japan . |
| 1101871 | 1/1968 | United Kingdom . |

*Primary Examiner*—Tae H. Yoon
*Attorney, Agent, or Firm*—Keil & Weinkauf

[57] ABSTRACT

Flameproofed thermoplastic molding materials contain

A) from 10 to 98.45% by weight of a thermoplastic polyamide,

B) from 1 to 30% by weight of phosphorus,

C) from 0.5 to 30% by weight of an elastomeric polymer,

D) from 0.05 to 15% by weight of a polyethylene having a density of from 0.94 to 0.98 g/cm$^3$ or of a polypropylene having an average molecular weight $\overline{M}_w$ of from 100,000 to 2,000,000 or a mixture thereof and E) from 0 to 60% by weight of a fibrous or particulate filler.

6 Claims, 1 Drawing Sheet

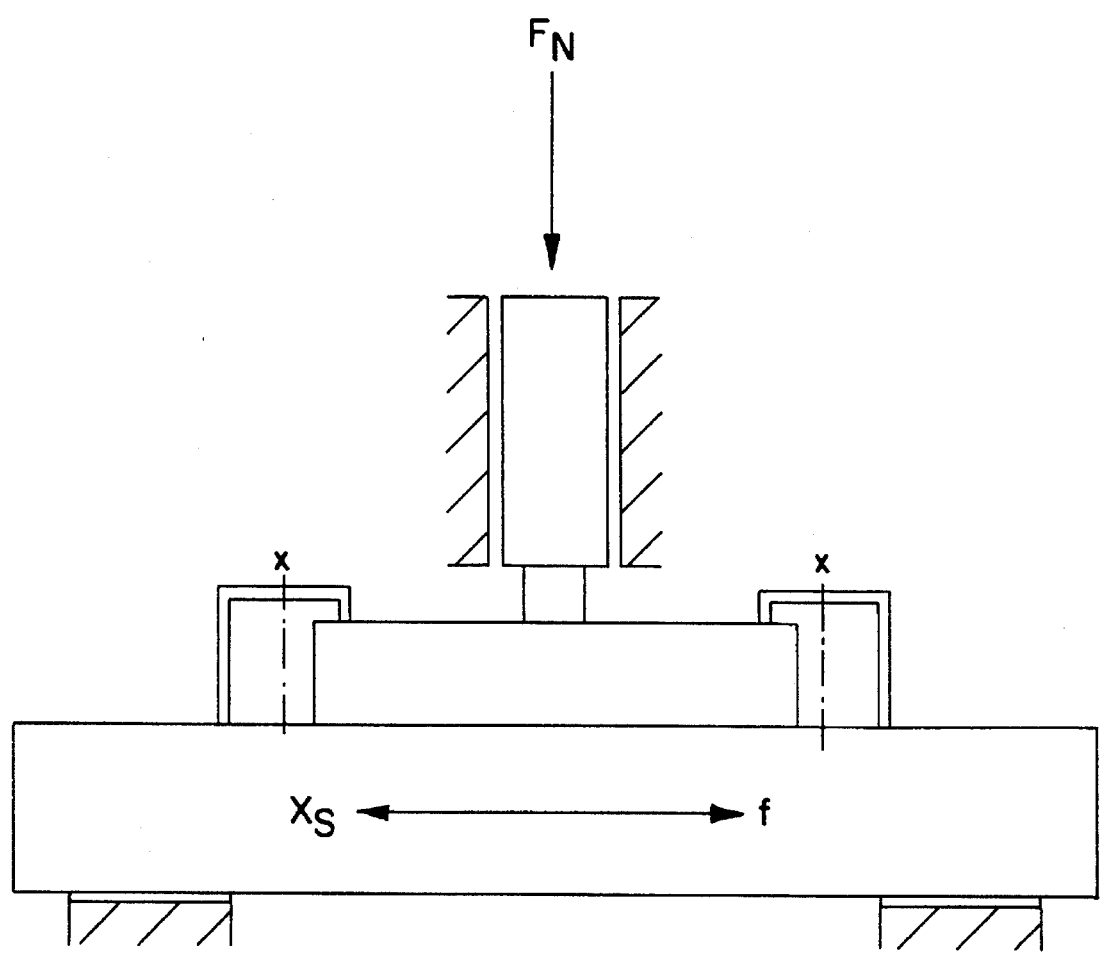

FLAMEPROOFED THERMOPLASTIC MOLDING MATERIALS

This application is a continuation of application Ser. No. 07/814,634, filed on Dec. 30, 1991, now abandoned.

The present invention relates to flameproofed thermoplastic molding materials containing A) from 10 to 98.45% by weight of a thermoplastic polyamide, B) from 1 to 30% by weight of phosphorus, C) from 0.5 to 30% by weight of an elastomeric polymer, D) from 0.05 to 15% by weight of a polyethylene having a density of from 0.94 to 0.98 g/cm$^3$ or of a polypropylene having an average molecular weight $\overline{M}_w$ of from 100,000 to 2,000,000 or a mixture thereof and E) from 0 to 60% by weight of a fibrous or particulate filler.

The present invention furthermore relates to the use of these molding materials for the production of fibers, films and moldings and to the moldings obtainable from the novel molding materials.

DE-A 15 69 057 discloses antifriction materials comprising a continuous phase of synthetic plastic, for example polyamide, with discretely embedded particles of a polyolefin.

The use of polyolefin homopolymers in flameproofed molding materials results in a dramatic deterioration in the flameproof properties of polyamide moldings.

Toughened polyamide moldings which contain red phosphorus as the flameproofing component do not have satisfactory sliding friction properties, which in particular restricts the use for electrical components, since the function of the components is adversely affected by the abrasion.

EP-A 92 776 discloses a process for flameproofing polyamides, in which the stabilizer is incorporated into the polyamide in the form of a 10–90% strength by weight polyolefin masterbatch, the polyolefin having a low density.

EP-A 205 662 discloses a coated phosphorus, the coating consisting of low density polyethylene.

The polyethylene carrier resins are generally poorly compatible with the thermoplastics, with the result that incorporation is more difficult (agglomeration) and the low phase adhesion leads to a deterioration in the mechanical properties of the moldings produced therefrom.

In addition, the red phosphorus, being a particulate filler, has an adverse effect on the mechanical properties, such as abrasion of polyamide moldings, so that low molecular weight polyolefins or low density polyolefins having correspondingly low crystallinities were used in the prior art in order to avoid a further deterioration in the mechanical properties due to high crysallinity. Moreover, the flameproofed properties of these moldings are unsatisfactory.

It is an object of the present invention to provide flameproofed thermoplastic molding materials which have good fire behavior in conjunction with good mechanical properties, in particular good sliding friction properties.

We have found that this object is achieved by the flameproofed molding materials defined at the outset.

Preferred molding materials of this type and the use thereof are described in the subclaims.

The novel molding materials contain, as component A), from 10 to 98.45, preferably from 15 to 97.75, in particular from 20 to 96, % by weight of a thermoplastic polyamide. Novel molding materials which additionally contain component E) have a content of from 10 to 97.45, preferably from 10 to 87.75, in particular from 15 to 76, % by weight of component A).

The polyamides of the novel molding materials generally have a relative viscosity $\eta_{rel}$ of from 1.7 to 5.0, determined in a 1% strength by weight solution in 96% strength by weight sulfuric acid at 25° C., which corresponds to a K value (according to Fikentscher) of from 50 to 96. Polyamides having a relative viscosity of from 2.3 to 4.5, in particular from 2.5 to 4.0, are preferably used.

Semicrystalline or amorphous resins having a weight average molecular weight of not less than 5,000, as described in, for example, U.S. Pat. Nos. 2,071,250, 2,071, 251, 2,130,523, 2,130,948, 2,241,322, 2,312,966, 2,512,606 and 3,393,210, are preferred.

Examples of these are polyamides which are derived from lactams having from 7 to 13 ring members, such as polycaprolactam, polycapryllactam and polylaurolactam, and polyamides which are obtained by reacting dicarboxylic acids with diamines.

Suitable dicarboxylic acids are alkanedicarboxylic acids of 6 to 12, in particular 6 to 10, carbon atoms and aromatic dicarboxylic acids. Only adipic acid, azelaic acid, sebacic acid, dodecanedioic acid and terephthalic and/or isophthalic acid are mentioned here as acids.

Particularly suitable diamines are alkanediamines of 6 to 12, in particular 6 to 8, carbon atoms and m-xylylenediamine, di-(4-aminophenyl)-methane, di-(4-aminocyclohexyl)-methane, 2,2-di-(4-aminophenyl)-propane or 2,2-di-(4-aminocyclohexyl)-propane.

Preferred polyamides are polyhexamethyleneadipamide, polyhexamethylenesebacamide and polycaprolactam.

Polyamides which are obtainable by copolymerization of two or more of the abovementioned monomers, or mixtures of a plurality of polyamides, are also suitable.

Examples are partly aromatic copolyamides, in particular those whose units are derived from terephthalic acid and hexamethylenediamine, from adipic acid and hexamethylenediamine or from terephthalic acid, hexamethylenediamine and ε-caprolactam. Particular examples of these are copolyamides whose triamine content (content of bishexamethylenetriamine) is less than 0.5% by weight. Corresponding products are obtainable by a method similar to that described in EP-A 129 195 and 129 196.

Other examples of polyamides are those which are obtainable, for example, by condensation of 1,4-diaminobutane with adipic acid at elevated temperatures (nylon 4, 6). Preparation processes for polyamides having this structure are described in, for example, EP-A 38 094, EP-A 38 582 and EP-A 39 524.

The novel molding materials contain, as component (B), from 1 to 30, preferably from 1 to 20, in particular 2 to 20, % by weight of red or black phosphorus. If the novel molding materials contain component E), they contain from 1 to 30, preferably from 1 to 25, in particular from 2 to 20, % by weight of Phosphorus B).

A preferred flameproofing agent (B) is elemental red phosphorus, in particular in combination with glass fiber-reinforced molding materials, which can be used in the untreated form.

However, particularly suitable formulations are those in which the phosphorus is coated on the surface with low molecular weight liquid substances, such as silicone oil, liquid paraffin or esters of phthalic acid or adipic acid or with polymeric or oligomeric compounds, for example phenol resins or aminoplasts and polyurethanes.

Masterbatches of red phosphorus, for example in a polyamide or elastomer are also suitable flameproofing agents. Polyolefin homo- and copolymers are particularly suitable masterbatch polymers. However, the content of the masterbatch polymer should not be more than 35% by weight, based on the weight of components (A) and (B) in the novel molding material.

The median particle size ($d_{50}$) of the phosphorus particles distributed in the molding material is preferably from 0.0001 to 0.5 mm, in particular from 0.001 to 0.2 mm.

The novel thermoplastic molding materials contain, as component (C), from 0.5 to 30, preferably from 0.5 to 20, in particular from 1 to 15, % by weight of an elastomeric polymer; in the case of filler-containing molding materials, the rubber content is from 0.5 to 30, preferably from 1 to 25, in particular from 1 to 20, % by weight.

Preferred elastomeric polymers are polymers based on olefins, which are composed of the following components:

$c_1$) 40–100% by weight of one or more α-olefins of 2 to 8 carbon atoms, $c_2$) 0–50% by weight of a diene, $c_3$) 0–45% by weight of a $C_1$–$C_{12}$-alkyl ester of acrylic acid or methacrylic acid or a mixture of such esters, $c_4$) 0–40% by weight of an ethylenically unsaturated mono- or dicarboxylic acid or a functional derivative of such an acid, $c_5$) 0–40% by weight of a monomer containing epoxy groups and $c_6$) 0–5% by weight of other monomers which can undergo free radical polymerization, with the proviso that the component (C) is not an olefin homopolymer.

A first preferred group comprises the ethylene/propylene (EPM) or ethylene/propylene/diene (EPDM) rubbers, which preferably have a ratio of ethylene units to propylene units of from 40:60 to 90:10.

The Mooney viscosities (MLI+4/100° C.) of such, preferably unvulcanized, EPM or EPDM rubbers (gel contents in general less than 1% by weight) are preferably from 25 to 100, in particular from 35 to 90 (measured using the large rotor after a running time of 4 minutes at 100° C. according to DIN 53,523).

EPM rubbers generally have virtually no more double bonds, whereas EPDM rubbers may have from 1 to 20 double bonds per 100 carbon atoms.

Examples of diene monomers $c_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[ 5.2.1.0.2.6]-3,8-decadiene or mixtures thereof. Hexa- 1,5-diene, 5-ethylidenenorbornene and dicyclopentadiene are preferred. The diene content of the EPDM rubbers is preferably from 0.5 to 50, in particular from 2 to 10, particularly preferably from 3 to 15, % by weight, based on the total weight of the olefin polymer.

EPM and EPDM rubbers can preferably also be grafted with reactive carboxylic acids or derivatives thereof. Acrylic acid, methacrylic acid and derivatives thereof and maleic anhydride may be mentioned in particular here.

A further group of preferred olefin polymers comprises copolymers of α-olefins of 2 to 8 carbon atoms, in particular of ethylene, with $C_1$–$C_{18}$-alkyl esters of acrylic acid and/or methacrylic acid.

All primary and secondary $C_1$–$C_{18}$-alkyl esters of acrylic acid or methacrylic acid are in principle suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of the methacrylates and acrylates $c_3$) in the olefin pollers is 0–60, preferably 10–50, in particular 30–45, % by weight.

Instead of the ester $c_3$), or in addition to it, the olefin polymers may also contain ethylenically unsaturated mono- or dicarboxylic acids $c_4$) as monomers having acid functional and/or latent acid functional groups or monomers $c_5$) having epoxy groups.

Examples of monomers $c_4$) are acrylic acid, methacrylic acid, tertiary alkyl esters of these acids, in particular tert-butyl acrylate, and dicarboxylic acids, such as maleic acid and fumaric acid, or derivatives of these acids and monoesters thereof.

Monomers having latent acid functional groups are to be understood as compounds which form free acid groups under the polymerization conditions or during incorporation of the olefin polymers into the molding materials. Examples of these are anhydrides of dicarboxylic acid of not more than 20 carbon atoms, in particular maleic anhydride, and tertiary $C_1$–$C_{12}$-alkyl esters of the abovementioned acids, in particular tert-butyl acrylate and tert-butyl methacrylate.

The monomers having acid functional or latent acid functional groups and the monomers containing epoxy groups are preferably incorporated in the olefin polymers by adding to the monomer mixture compounds of the general formulae I–IV

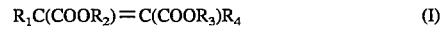

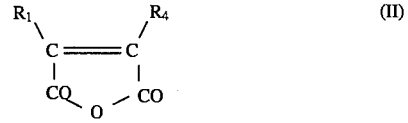

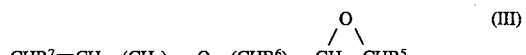

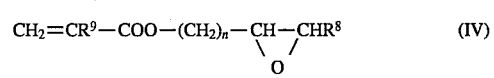

where $R^1$–$R^9$ are each hydrogen or alkyl of 1 to 6 carbon atoms, m is an integer of from 0 to 20 and n is an integer of from 0 to 10.

$R^1$–$R^7$ are each preferably hydrogen, m is preferably 0 or 1 and n is preferably 1. The corresponding compounds are maleic acid, fumaric acid or maleic anhydride, $c_4$) or alkenyl glycidyl ether or vinyl glycidyl ether $c_5$).

Preferred compounds of the formulae I, II, III and IV are maleic acid and maleic anhydride as component $c_4$) and esters, containing epoxy groups, of acrylic acid and/or methacrylic acid, glycidyl acrylate and glycidyl methacrylate (as component $c_5$) being particularly preferred.

The amount of components $c_4$) and $c_5$) is in each case from 0.07 to 40, in particular from 0.1 to 20, particularly preferably from 0.15 to 15, % by weight, based on the total weight of the olefin polymers.

Particularly preferred olefin polymers are those consisting of from 50 to 98.9, in particular from 60 to 95, % by weight of ethylene, from 0.1 to 20, in particular from 0.15 to 15, % by weight of glycidyl acrylate and/or glycidyl methacrylate, acrylic acid and/or maleic anhydride, and from 1 to 45, in particular from 10 to 35, % by weight of n-butyl acrylate and/or 2-ethylhexyl acrylate.

Further preferred esters of acrylic and/or methacrylic acid are the methyl, ethyl, propyl and isobutyl esters.

Examples of suitable other monomers $c_6$) are vinyl esters and vinyl ethers.

The ethylene copolymers described above can be prepared by conventional processes, preferably by random copolymerization under high pressure and at elevated temperatures.

The melt flow index of the ethylene copolymers is in general from 1 to 80 g/10 min (measured at 190° C. and under a load of 2.16 kg).

In addition to the above preferred elastomeric polymers based on olefins, for example the following polymers are suitable as elastomers (C).

Emulsion polymers may be mentioned primarily here, the preparation of which is described in, for example, Houben-Weyl, Methoden der organischen Chemie, Volume XII.1 (1961) and by Blackley in the Monograph Emulsion Polymerisation.

In principle, random elastomers or those having a shell structure may be used. The shell-like structure is determined by the order of addition of the individual monomers.

Examples of monomers for the preparation of the rubber part of the elastomers are acrylates, such as n-butyl acrylate and 2-ethylhexyl acrylate, corresponding methacrylates, butadiene and isoprene and mixtures thereof. These monomers can be copolymerized with further monomers, such as styrene, acrylonitrile, vinyl ethers and further acrylates or methacrylates, such as methyl methacrylate, methyl acrylate, ethyl acrylate and propyl acrylate.

The flexible or rubber phase (having a glass transition temperature below 0° C.) of the elastomers may represent the core, the outer shell or a middle shell (in the case of elastomers having a structure comprising more than two shells); in the case of multishell elastomers, it is also possible for a plurality of shells to consist of a rubber phase.

If, in addition to the rubber phase, one or more rigid components (having glass transition temperatures of more than 20° C.) are involved in the structure of the elastomer, they are generally prepared by polymerizing styrene, acrylonitrile, methacrylonitrile, α-methylstyrene, p-methylstyrene, acrylates and methacrylates, such as methyl acrylate, ethyl acrylate and methyl methacrylate, as main monomers. Here, too, smaller amounts of further comonomers may be used in addition.

In some cases, it has proven advantageous to use emulsion polymers which have reactive groups at the surface. Such groups are, for example, epoxy, carboxyl, latent carboxyl, amino or amido groups and functional groups which can be introduced by the concomitant use of monomers of the general formula $$CH_2=C-X-N-C-R^{12}$$
$$\phantom{CH_2=}|\phantom{-X-}|\phantom{-}\|$$
$$\phantom{CH_2=}R^{10}\phantom{-X-}R^{11}\phantom{-}O$$

where $R^{10}$ is hydrogen or $C_1$–$C_4$-alkyl, $R^{11}$ is hydrogen, $C_1$–$C_8$-alkyl or aryl, in particular phenyl, $R^{12}$ is hydrogen, $C_1$–$C_{10}$-alkyl, $C_6$–$C_{12}$-aryl or $OR^{13}$, $R^{13}$ is a $C_1$–$C_8$-alkyl or $C_6$–$C_{12}$-aryl group which may be substituted by O- or N-containing groups, X is a chemical bond, $C_1$–$C_{10}$-alkylene, $C_6$–$C_{12}$-arylene or

Y is O—Z— or NH—Z and Z is $C_1$–$C_{10}$-alkylene or $C_6$–$C_{12}$-arylene.

The graft monomers described in EP-A 208 187 are also suitable for the introduction of the reactive groups at the surface.

Further examples are acrylamide, methacrylamide and substituted esters of acrylic acid or methacrylic acid, such as (N-tert-butylamino)-ethyl methacrylate, (N, N-dimethylamino)-ethyl acrylate, (N, N-dimethylamino) methyl acrylate and (N, N-diethylamino)-ethyl acrylate.

The particles of the rubber phase may also be crosslinked. Monomers which act as crosslinking agents are, for example, buta-1,3-diene, divinylbenzene, diallyl phthalate and dihydrodicyclopentadienyl acrylate and the compounds described in EP-A 50 265.

Furthermore, graft-linking monomers may also be used, ie. monomers having two or more polymerizable double bonds which react at different rates during the polymerization. Preferably used compounds are those in which one or more double bonds undergo polymerization at about the same rate as the other monomers while the remaining double bonds undergo polymerization substantially more slowly. The different polymerization rates result in a certain proportion of unsaturated double bonds in the rubber. If a further phase is subsequently grafted onto such a rubber, some or all of the double bonds present in the rubber react with the graft monomers with the formation of chemical bonds, ie. the grafted phase is partially or completely linked to the grafting base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate, or the corresponding monoallyl compounds of these dicarboxylic acids. There is also a large number of further suitable graft-linking monomers; for further details, reference may be made to, for example, U.S. Pat. No. 4,148,846.

In general, the amount of these crosslinking monomers in component (C) is not more than 5, preferably not more than 3, % by weight, based on (C).

Some preferred emulsion polymers are listed below. First, graft polymers which have a core and one or more outer shells and possess the following composition are mentioned here:

| Type | Monomers for the core | Monomers for the shell |
|---|---|---|
| C/1 | Buta-1,3-diene, isoprene, n-butyl acrylate, ethylhexyl acrylate or mixtures thereof | Styrene, acrylonitrile or methyl methacrylate |
| C/2 | As for A but with the concomitant use of crosslinking agents | As for A |
| C/3 | As for A or B | n-Butyl acrylate, ethyl acrylate or methyl acrylate, buta-1,3-diene or isoprene or ethylhexyl acrylate |
| C/4 | As for A or B | As for A or C but with the concomitant use of monomers having reactive groups as described |

-continued

| Type | Monomers for the core | Monomers for the shell |
|---|---|---|
| C/5 | Styrene, acrylonitrile, methyl methacrylate or mixtures thereof | herein First shell of monomers as described under A and B for the core Second shell as described under A or C for the shell |

Instead of graft polymers having a multishell structure, it is also possible to use homogeneous, ie. single-shell, elastomers of buta-1,3-diene, isoprene and n-butyl acrylate or copolymers thereof. These products too can be prepared with the concomitant use of crosslinking monomers or monomers having reactive groups.

Examples of preferred emulsion polymers are n-butyl acrylate/(meth)acrylic acid copolymers, n-butyl acrylate/ glycidyl acrylate or n-butyl acrylate/glycidyl methacrylate copolymers, graft polymers having an inner core of n-butyl acrylate or based on butadiene and an outer shell of the abovementioned copolymers and copolymers of ethylene with comonomers which donate reactive groups.

The elastomers (C) described can also be prepared by other conventional processes, for example by suspension polymerization.

The novel molding materials contain, as component (D) from 0.05 to 15, preferably from 0.25 to 10, in particular from 1 to 10, % by weight of a polyethylene having a density of from 0.94 to 0.98 g/cm$^3$ or of a polypropylene having a weight average molecular weight ($\overline{M}_w$) of from 100,000 to 2,000,000, preferably from 300,000 to 1,000,000, in particular from 400,000 to 800,000.

If the novel molding materials contain component E), they contain from 0.05 to 10, preferably from 0.25 to 10, in particular from 1 to 5, % by weight of component D).

A preferred component D) is polyethylene having a high density of from 0.94 to 0.98, preferably from 0.95 to 0.96, in particular from 0.951 to 0.958, g/cm$^3$.

The melt flow index MFI is in general less than 5, preferably less than 3, g/10 min at 190° C. and under a load of 21.6 kg (determined according to DIN 53,735).

The melt flow index corresponds to the amount of polymer forced out of the test apparatus standardized according to DIN 53,735, in the course of 10 minutes, at 190° C. and under a load of 21.6 kg.

Such polyolefins are usually prepared by low pressure polymerization using metal-containing catalysts, for example with the aid of titanium- and aluminum-containing Ziegler catalysts or, in the case of polyethylene, also by means of Phillips catalysts based on chromium-containing compounds. The polymerization reaction can be carried out using the reactors conventionally employed in industry, in the gas phase, in solution or in suspension. In the preparation of the novel polymer blend, the polyethylene or polypropylene can be used both as grit and as granules. It is also possible to use blends of polyethylene with polypropylene, any mixing ratio being possible.

It is also advantageous to use the red phosphorus B) in the form of a masterbatch with D).

The novel molding materials may contain, as a further component, from 0 to 60, preferably from 1 to 50, in particular from 10 to 40, very particularly from 20 to 30, % by weight of a fibrous or particulate filler (component (E)) or a mixture thereof.

Preferred fibrous reinforcing materials (component (E)) are carbon fibers, potassium titanate whiskers, Aramid fibers and particularly preferably glass fibers. When glass fibers are used, they may be provided with a size and an adhesion promoter to improve the compatibility with the thermoplastic polyamide (A). In general, the glass fibers used have a diameter of from 6 to 20 μm.

These glass fibers may be incorporated in the form of both short glass fibers and rovings. In the finished injection molded article, the mean length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with 15% by weight of wollastonite.

In addition to the essential components A) to D) and, if required, E), the novel molding materials may contain conventional additives and processing assistants. The amount of these is in general not more than 20, preferably not more than 10, % by weight, based on the total weight of components (A) to (D).

Conventional additives are, for example, stabilizers and antioxidants, heat stabilizers and UV stabilizers, lubricants and mold release agents, dyes and pigments and plasticizers.

Antioxidants and heat stabilizers which may be added to the thermoplastic materials according to the invention are, for example, halides of metals of Group I of the Periodic Table, for example sodium, potassium and lithium halides, if necessary in combination with copper(I) halides, for example chlorides, bromides or iodides. Zinc fluoride and zinc chloride may also be used. Sterically hindered phenols, hydroquinones, substituted members of this group and mixtures of these compounds, preferably in concentrations of not more than 1% by weight, based on the weight of the mixture, may also be employed.

Examples of UV stabilizers are various substituted resorcinols, salicylates, benzotriazoles and benzophenones, which are used in general in amounts of not more than 2% by weight.

Lubricants and mold release agents, which as a rule are added in amounts of not more than 1% by weight, based on the thermoplastic material, are stearic acid, stearyl alcohol, alkyl stearates and stearamides, as well as esters of pentaerythritol with long-chain fatty acids. It is also possible to use salts of calcium, of zinc or of aluminum with stearic acid and dialkyl ketones (STEARON® from Henkel).

The additives include stabilizers which prevent the decomposition of the red phosphorus in the presence of moisture and atmospheric oxygen. Examples are compounds of cadmium, of zinc, of aluminum, of tin, of magnesium, of manganese and of titanium. Particularly suitable compounds are, for example, oxides of the stated metals, as well as carbonates or basic carbonates, hydroxides and salts of organic or inorganic acids, such as acetates or phosphates and hydrogen phosphates.

The novel thermoplastic molding materials can be prepared by conventional processes, by mixing the starting components in a conventional mixing apparatus, such as an extruder, a Brabender mill or a Banbury mill and then extruding the mixture. After extrusion, the extrudate is cooled and comminuted.

Novel materials can also be prepared by a pultrusion process, as described in EP-A-56 703. Here, the glass roving is impregnated with the polymer material and then cooled and comminuted. The glass fiber length in this case is identical to the length of the granules and is from 3 to 20 mm.

The novel molding materials are distinguished by their constant mechanical properties, which are achieved by improved abrasion in conjunction with good impact strength.

In addition, they have good flame retardance, creep resistance and phosphorus stability.

As a result of this property spectrum, the moldings which can be produced from the novel molding materials are particularly suitable for electrical and electronic components, for example electric motor components (motor protection switches, power protectors), electric heaters or housing parts for high voltage switches. Glass fiber-reinforced moldings are used in particular as plugs, plug connectors or jacks in the telecommunication sector.

BRIEF DESCRIPTION OF THE DRAWINGS

FIG. 1 depicts suitable apparatus for measuring the rate of wear of the molding materials.

EXAMPLES

The following components were used for the preparation of the novel molding materials:

Component (A)

Nylon 6,6 (polyhexamethyleneadipamide) having a viscosity number of 135, corresponding to a relative viscosity $\eta_{rel}$ of 2.4 (measured as a 0.5% strength solution in 96% strength by weight $H_2SO_4$ according to ISO 307).

Component (B)

Red phosphorus having a median particle size ($d_{50}$) of 45 μm.

Component (C)

An olefin polymer of

60% by weight of ethylene

35% by weight of n-butyl acrylate 4.3% by weight of acrylic acid 0.7% by weight of maleic anhydride, having an MFI of 10 g/10 min at 190° C. and under a load of 2.16 kg.

Component (D)

Polyethylene having a weight average molecular weight $\overline{M}_w$ of 450,000, the MFI being 2 g/10 min (190° C. and 21.6 kg load) and a density of 0.954 g/cm³.

Component (E)

Glass fibers having a diameter of 10 μm.

The components were mixed in a twin-screw extruder at from 290° to 300° C. and extruded into a water bath.

After granulation and drying, the test specimens were injection molded on an injection molding machine and were tested.

The fire behavior was tested according to UL 94 using 1/16 inch bars; the classification V (or HB) means that the specimen burns through to the holder.

The Izod impact strength $a_n$ was determined according to DIN 53,453, and the damaging energy $w_{50}$ was determined according to DIN 53,443, Part 1.

To measure the phosphorus stability, test specimens were left in a water bath at 60° C., a sample being taken after 10 days to determine the water-soluble phosphorus compounds by means of AAS.

The creep resistance (CTI) was determined according to DIN 112, ASTM-D 3638.

To determine the rate of wear $W_{m/s}$, the measuring apparatus according to FIG. 1 was used.

A test specimen (diameter 3 mm) was pressed onto a test substrate (120×14×10 mm) with a mean surface pressure P ($F_N$) of 2 N/mm². The frequency of movement f was 3 Hz and the movement amplitude $\Delta X_s = \pm 2$ mm. The number of stress cycles endured was 150,000, corresponding to a sliding distance s of 1 km.

The test specimen and the substrate had the same compositions according to Table 1, in which the results of the measurements are shown.

TABLE

| Test No. | 1* | 2* | 3* | 4 | 5 |
|---|---|---|---|---|---|
| Component A [% by weight] | 62.1 | 66.6 | 60.6 | 60.6 | 60.6 |
| B | 4.4 | 4.4 | 4.4 | 4.4 | 4.4 |
| C | 6.0 | — | — | 3.0 | 5.0 |
| D | — | — | 6.0 | 3.0 | 1.0 |
| E | 27.5 | 27.5 | 27.5 | 27.5 | 27.5 |
| F (ZnO) | — | 1.5 | 1.5 | 1.5 | 1.5 |
| Rate of wear $W_{m/s}$ [mg/km] | 33.0 | 3.2 | 0.0 | 0.5 | 0.2 |
| Fire behavior UL 94 [1/16"] | V-0 | V-0 | V- | V-0 | V-0 |
| Impact strength $a_n$ [kJ/m²], 23° C. | 45 | 35 | 34 | 43 | 44 |
| Damaging energy $W_{50}$ [Nm], 23° C. | 2.6 | 1.1 | 1.0 | 2.5 | 2.5 |
| Soluble phosphorus [ppm/10 d] | 40 | 10 | 12 | 10 | 11 |
| Creep resistance CTI [V] | 600 | 500 | 550 | 600 | 600 |

*For comparison

We claim:

1. A flameproofed thermoplastic molding material consisting essentially of

A) from 10 to 98.45% by weight of a thermoplastic polyamide,

B) from 1 to 30% by weight of phosphorus,

C) from 0.5 to 30% by weight of an elastomeric polymer,

D) from 0.05 to 15% by weight of a polyethylene having a density of from 0.94 to 0.98 g/cm³ or of a polypropylene having an average molecular weight $\overline{M}_w$ of from 100,000 to 2,000,000 or a mixture thereof and E) from 0 to 60% by weight of a fibrous or particulate filler.

2. A flameproofed thermoplastic molding material as defined in claim 1, consisting essentially of from 10 to 97.45% by weight of A), from 1 to 30% by weight of B), from 0.5 to 30% by weight of C), from 0.05 to 10% by weight of D) and from 1 to 50% by weight of E).

3. A flameproofed thermoplastic molding material as defined in claim 1, in which component D) is composed of a polyethylene having a density of from 0.95 to 0.96 g/cm³.

4. A flameproofed thermoplastic molding material as defined in claim 1, in which component D) is composed of a polypropylene having an average molecular weight of from 300,000 to 1,000,000.

5. A flameproofed thermoplastic molding material as defined in claim 1, in which component C) is an olefin copolymer which is composed of $c_1$) from 40 to 100% by weight of one or more α-olefins of 2 to 8 carbon atoms, $c_2$) from 0 to 50% by weight of a diene, $c_3$) from 0 to 45% by weight of a primary or secondary $C_1$–$C_{12}$-alkyl ester of acrylic acid or methacrylic acid or a mixture of such esters, $c_4$) from 0 to 40% by weight of an ethylenically unsaturated mono- or dicarboxylic acid as a monomer having acid functional or latent acid functional groups, $c_5$) from 0 to 40% by weight of a monomer containing epoxy groups and $c_6$) from 0 to 5% by weight of other monomers which can undergo free radical polymerization.

6. A molding obtained from a flameproofed thermoplastic molding material as defined in claim 1.

* * * * *